United States Patent
Sapashe

[11] Patent Number: 6,141,331
[45] Date of Patent: Oct. 31, 2000

[54] SELECTIVE CALL RECEIVER WITH AUTOMATIC RE-REGISTRATION CAPABILITY

[75] Inventor: Darren T. Sapashe, Delray Beach, Fla.

[73] Assignee: Motorola, Inc., Schaumburg, Ill.

[21] Appl. No.: 09/080,563

[22] Filed: May 18, 1998

[51] Int. Cl.[7] .................................................. H04B 7/185
[52] U.S. Cl. ........................ 370/316; 455/432; 455/433; 455/12.1
[58] Field of Search ..................................... 370/315, 316, 370/310, 328, 329, 341; 455/432, 433, 435, 456, 12.1, 13.2, 11.1, 13.1, 457

[56] References Cited

U.S. PATENT DOCUMENTS 5,289,527  2/1994  Tiedemann, Jr. ........................ 342/457
5,619,209  4/1997  Horstein et al. ........................ 342/352

Primary Examiner—Ajit Patel
Attorney, Agent, or Firm—M. Mansour Ghomeshi; Philip P. Macnak

[57] ABSTRACT

An SCR (Selective Call Receiver) (16) that operates in a satellite communication system automatically initiates a re-registration procedure when it roams from one message delivery area (10) to another message delivery area (12). This is accomplished by the SCR (16) determining its present location, determining the distance which it may have roamed from a known previous location and, if that distance exceeds a given distance, initiating the re-registration procedure.

12 Claims, 4 Drawing Sheets

SELECTIVE CALL RECEIVER WITH AUTOMATIC RE-REGISTRATION CAPABILITY

FIELD OF THE INVENTION

This invention is directed generally to SCR's (Selective Call Receivers) that operate in a satellite communication system, and particularly to techniques for ensuring that an SCR can roam without missing its messages.

BACKGROUND OF THE INVENTION

In satellite communication systems, SCR's on the surface of the earth receive messages transmitted from orbiting satellites. An SCR is able to receive its messages if the system knows where the SCR is located and can, therefore, cause the messages to be transmitted by satellites whose beams illuminate a Message Delivery Area (MDA) where the SCR is located.

When an SCR roams, it can move from one MDA to a relatively remote MDA, as when moving from the midwestern region of the United States to Japan. Unless the SCR's user notifies the communication system that the SCR has moved to a different MDA, the system will continue to send messages to the SCR using satellites whose beams illuminate the SCR's previous MDA. All such messages will be lost, and the user will be unaware that he has missed any messages. It is important, therefore, to ensure that the communication system is notified of any change in location that is large enough to cause an SCR to be moved to a different MDA.

DESCRIPTION OF THE PREFERRED EMBODIMENT

A satellite communication system is described in U.S. Pat. No. 5,613,194 entitled "Satellite Based Cellular Messaging System and Method of Operation Thereof", the teachings of which are incorporated herein by reference. It is assumed that the SCR's discussed herein are operating within that type of satellite communication system and using the signaling protocol described therein, although other signaling protocols could be used.

In such a satellite communication system, the surface of the earth is divided into Logical Delivery Areas, referred to herein as LDA's. There are 26,631 sequentially numbered LDA's, each with a diameter of about 150 km (kilometers). At any given point in time, an SCR will be in one such LDA, and it can roam from one LDA to another.

Figure 1:
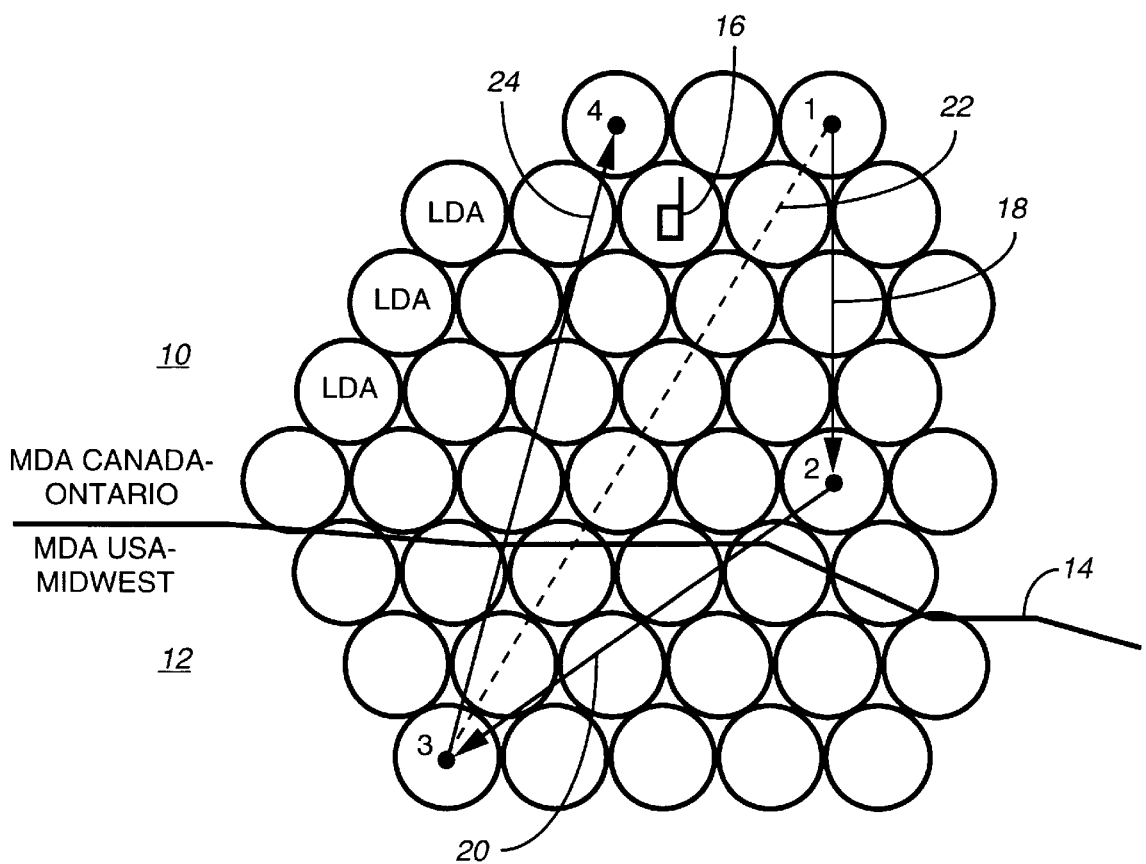
FIG. 1 shows a pair of MDA's and an exemplary route that a SCR might follow while moving between the MDA's.

Referring to FIG. 1, a plurality of LDA's are shown, some of which are located in an MDA 10, with others located in an adjacent MDA 12. A line 14 indicates the boundary between the two MDA's.

An SCR 16 that is located in MDA 10 can roam across the boundary 14 to the other MDA 12, or it can roam to a more distant MDA that may be located on another continent. While the SCR 16 is in MDA 10, the communication system knows that the SCR is located there and causes messages for that SCR to be transmitted by satellites whose beams are scheduled to illuminate the LDA's in MDA 10.

When the SCR 16 roams into MDA 12, it may be too far from the beams that illuminate MDA 10 to reliably receive any messages carried by those beams. Consequently, the user of the SCR 16 must notify the communication system that he is in MDA 12 so that the user's messages can by transmitted by satellites whose beams are scheduled to illuminate MDA 12. If the user is unaware that he has roamed far into MDA 12, or forgets to notify the communication system that he has moved to a different MDA, he will probably miss his messages.

With this invention, the user of an SCR is prompted by his SCR to notify the communication system that he has roamed to a different MDA, thus enabling the system to direct future messages to the MDA where he is located. The preferred method for accomplishing this will be explained first by reference again to FIG. 1.

Assume that the SCR 16 starts in MDA 10, at LDA 1. SCR 16 then moves via route 18 to LDA 2. The SCR 16 determines that its new location is in LDA 2, and that the distance between LDA's 1 and 2 is less than a given cutoff distance that is programmed into the SCR. For example, the cutoff distance may be 1000 km (kilometers), and the distance from LDA 1 to LDA 2 may be 500 km. Because the 500 km distance is less than the given distance (1000 km), the SCR does not alert the user.

Next, the SCR moves from LDA 2 to LDA 3, and it calculates the distance (dashed line 22) between LDA 3 and LDA 1. If this distance is equal to or greater than the given distance (1000 km), the SCR initiates a re-registration procedure. The re-registration procedure preferably includes alerting the user, by way of a display, audible alert, or the like, that the SCR has likely roamed into a different MDA, and that the user should notify the communication system. If the SCR is a two-way device, i.e., if it can transmit as well as receive, the re-registration procedure preferably includes the SCR automatically transmitting a re-registration notice to the communication system.

Assume now that the SCR roams back into MDA 10 via route 24. Once again, the SCR determines that its present location is in LDA 4, and it calculates the distance from LDA 3 to LDA 4. In this example, the latter distance is 950 km, 50 km less than the given (cut-off) distance. Consequently, no-re-registration procedure is initiated. It is assumed that when an SCR roams out of its original MDA, but the distance roamed is less than the given distance, it will still be able to see the satellites that illuminate its original MDA. Thus, the SCR that is now located in LDA 4 should still be able to see the satellites which illuminate MDA 12. Thus, the cutoff distance is chosen such that an SCR that roams beyond the cutoff distance has likely moved to a different MDA, but the SCR should still be able to barely see the satellites that illuminate the MDA from which it roamed.

In the foregoing example, the SCR 16 was originally registered in MDA 10. Its movement from LDA 1 to LDA 2 resulted in no re-registration, but its movement from LDA 2 from LDA 3 gave rise to a re-registration procedure. The next movement from LDA 3 to LDA 4 resulted in no re-registration procedure, but if further movement occurred that resulted in positioning the SCR at least 1000 km away from LDA 3, the re-registration procedure would occur.

Figure 2:
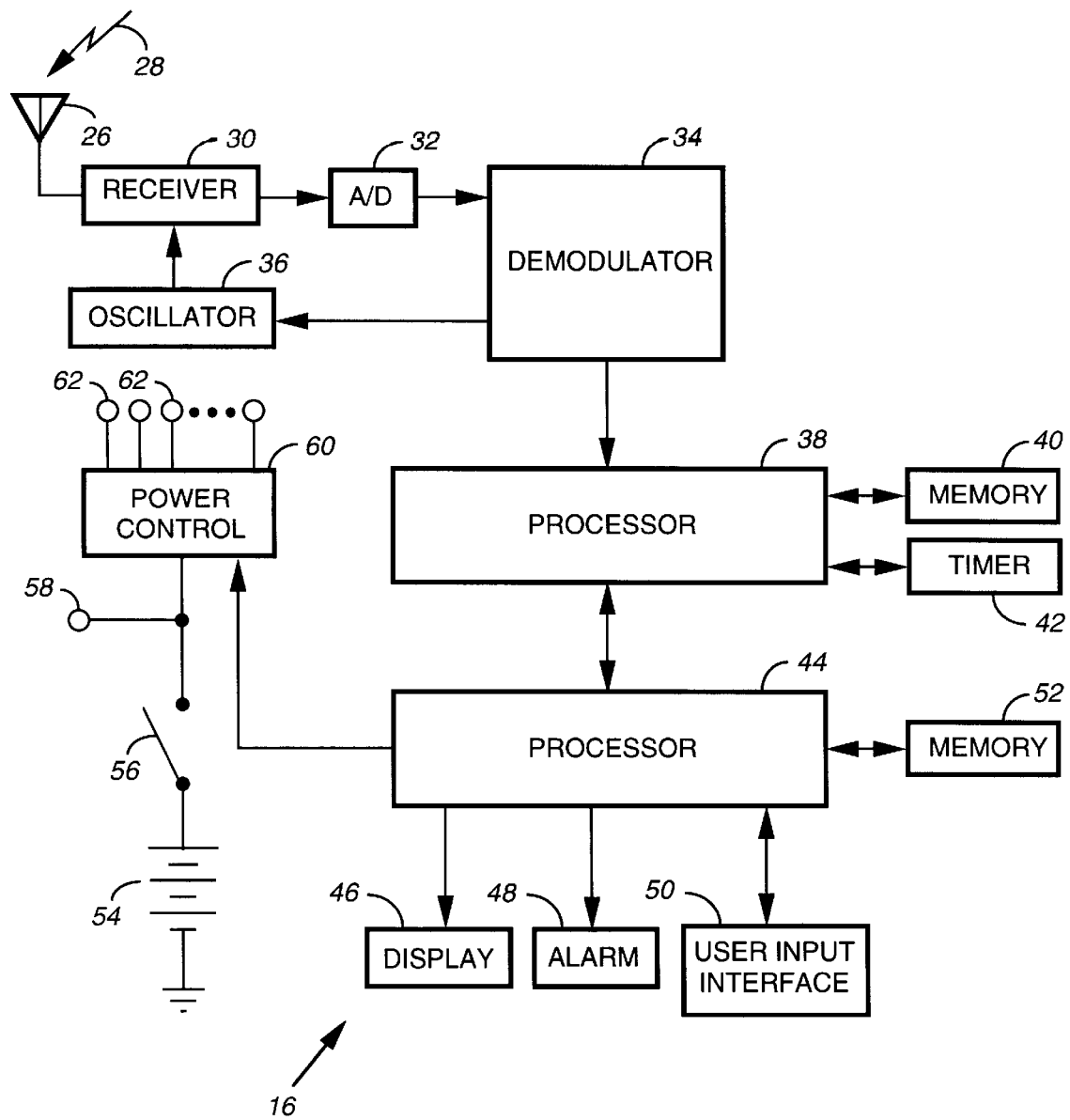
FIG. 2 is a block diagram of a SCR that operates in accordance with the invention.

An SCR that is programmed to operate in accordance with the invention is shown in FIG. 2. The illustrated SCR 16 includes an antenna 26 through which a communication link 28 is established with satellite transmitters. Antenna 26 feeds a receiver 30 which includes RF (Radio-Frequency), mixing, and intermediate-frequency stages (not shown) as needed to convert RF signals to baseband. Receiver 30 couples to an analog-to-digital (A/D) converter 32 which digitizes the baseband signal, and A/D converter 32 couples to a digital demodulator 34 that extracts digital data from the digitized baseband signal.

The demodulator 34 recovers Quaternary or Binary phase shift keying data included in the transmission from link 28. Demodulator 34 also supplies a feedback signal to control an oscillator 36. Oscillator 36 provides an oscillation signal that receiver 30 uses in converting the RF signal to baseband.

Demodulator 34 feeds its digital data output to a processor 38 which may be a TMS320C54x digital signal processor made by Texas Instruments, Inc. Processor 38 couples to a memory 40 which permanently stores certain data, including computer programs that instruct SCR 16 to perform various procedures, including calculating its position and otherwise operating in accordance with the invention. The memory 40 also stores temporary data which changes as a result of operating the SCR. A timer 42 synchronizes the processor 38 with system timing and enables the processor to keep track of the time of day.

Another processor 44, such as a 68HC11 made by Motorola, Inc., couples to various peripheral devices, such as a display 46, an alarm 48, a user input interface 50, and a memory 52. Processor 44 controls display 46 to show data to a user of SCR 16, and the same processor controls alarm 48 to audibly, visibly and/or by vibration indicate the receipt of a message addressed to SCR 16. Processor 44 receives user input, preferably through the operation of keys or buttons (not shown) through interface 50.

SCR 16 is energized by a battery 54 which couples through a power switch 56 to a terminal 58 and to a power control section 60. Power control section 60 switches power to terminals 62 in accordance with commands received from processor 44. Terminal 58 supplies power to at least timer 52, while terminals 62 supply power to the remaining components of SCR 16.

SCR 16 is de-energized when switch 56 is open, and it is fully energized and operational when switch 56 is closed and when power is routed to all of terminals 62. SCR 16 may also operate in an energized but low power sleep mode when power is not routed to one or more of terminals 62, but switch 56 is closed to route power through terminal 58 to at least timer 42.

Figure 4:
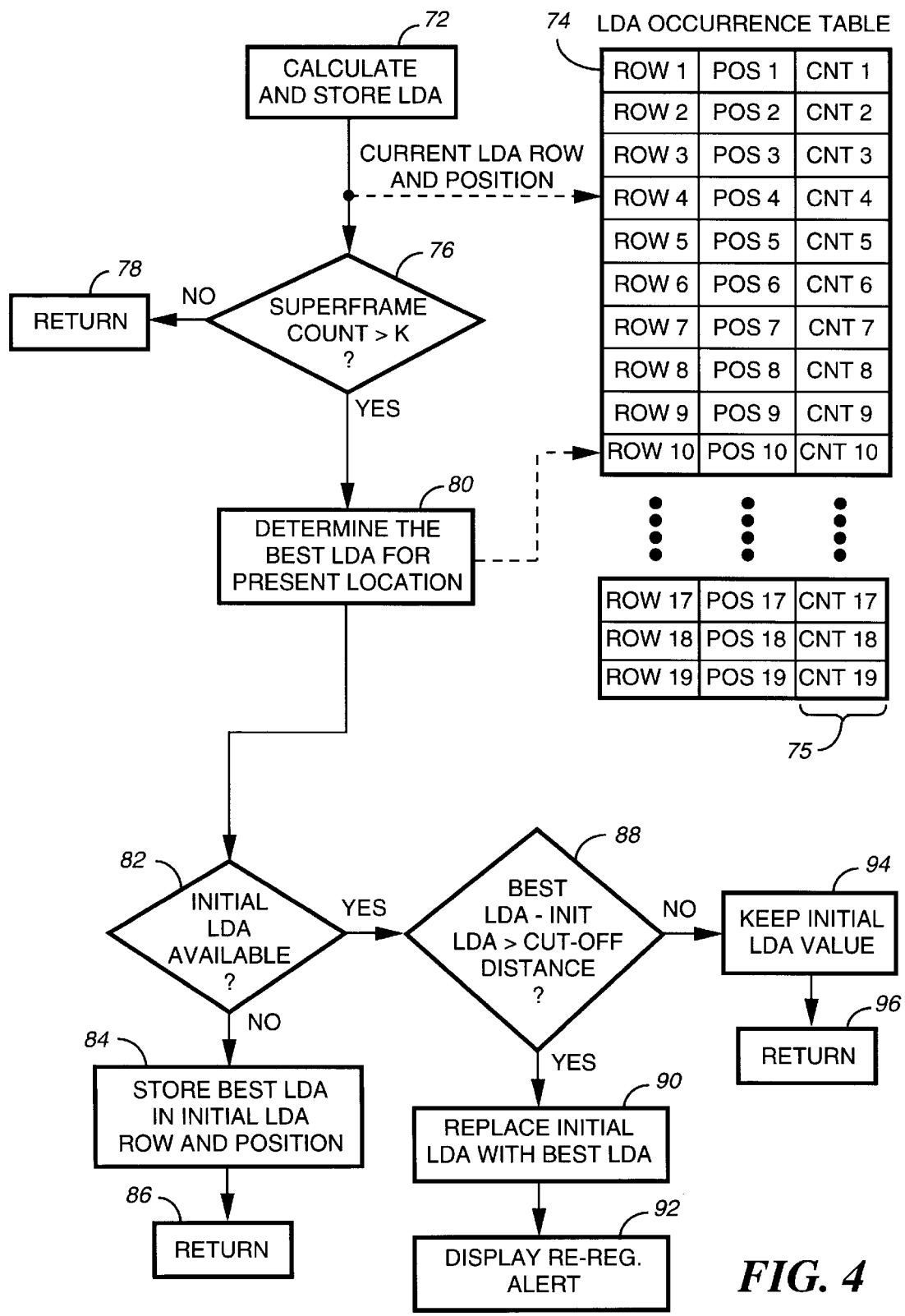
FIG. 4 is a flow chart showing how one of the processors in FIG. 2 is preferably programmed to operate the SCR according to the invention.

Further description of the SCR 16 is available in the above-referenced Patent. For purposes of this invention, it suffices to add that the processor 38 causes the SCR 16 to operate in accordance with the invention by virtue of a computer program and other information that is stored in the memory 40. The operation of the computer program is represented by the flow chart of FIG. 4 that is discussed later.

Figure 3:
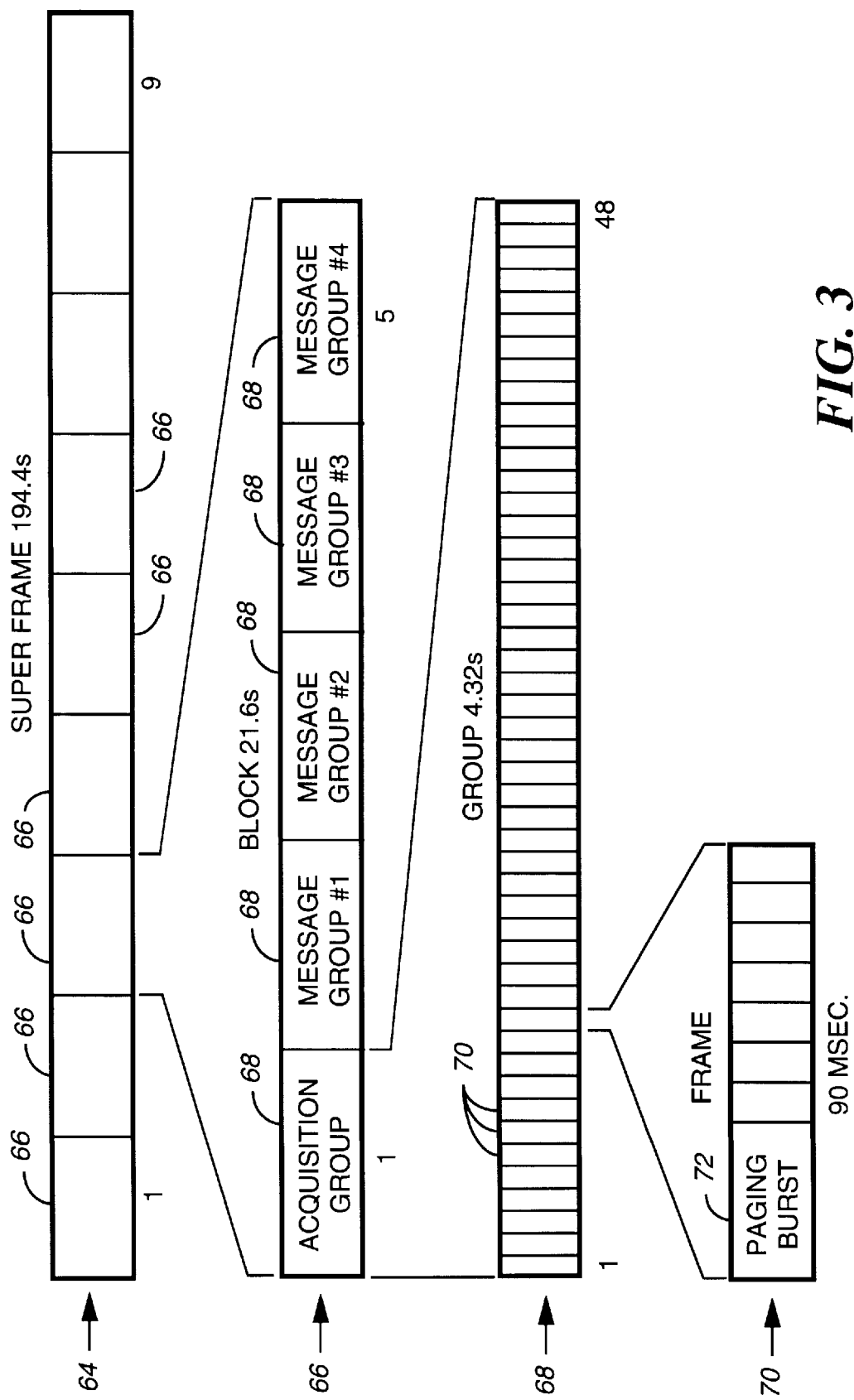
FIG. 3 is a diagram illustrating a signaling protocol that is used in the satellite communication system discussed herein.

The signaling protocol used by the SCR 16 will now be discussed briefly with reference to FIG. 3. The illustrated protocol has a framing structure with a four-level timing hierarchy. The highest level of this hierarchy is a 194.4 second (2160 frames) superframe 64. In the preferred mode of operation that is described more fully below, the SCR uses the superframe as a time reference in the process of determining its location.

The superframe 64 comprises nine blocks 66 of 21.6 seconds (240 frames) each. Each block 66 comprises 5 groups 68 of 4.32 seconds (forty-eight frames). The first group of each block 66 is an Acquisition Group that contains 48 frames 70 of scheduling information for SCR's known to be located within the area being served. That scheduling information tells those SCR's where to look for messages within four subsequent message groups. Each of the 48 frames is transmitted by a different one of the 48 beams that are included in each beam pattern. Finally, each frame 70 includes a simplex message time slot 72, typically used as a paging burst having a duration of 20.32 ms. The remainder of the frame 70 is typically used for telephone service.

Each SCR is active at least during one or more of the blocks 66 that are part of a super frame. When an SCR becomes active, it synchronizes itself to the signaling protocol and decodes the Acquisition Group to determine which particular message groups to monitor for its messages. All SCR's that are active during a particular block 16 attempt to decode the Acquisition Group in that block and, if so directed, to look for messages within the message groups within that block. An SCR that operates according to the invention also preferably calculates its present position during each active state, as will now be explained more fully with reference to the flow chart of FIG. 4.

Per the first step 72, the SCR calculates and stores a value that represents its estimated present position. In this case, the calculated value preferably represents the identity of the LDA in which the SCR is most likely situated. This calculation is preferably effected by the technique described in U.S. application Ser. No. 09/028043, filed Feb. 23, 1998 by Rudowicz et al, and assigned to the assignee of this invention. The teachings of the Rudowicz et al Application are incorporated herein by reference. This calculation may reveal, for example, that the SCR is presently located in LDA 1 (FIG. 1). This first step 72 is executed each time the SCR becomes active, typically at least once during a superframe.

In the satellite communication system, the surface of the earth is encircled by 155 imaginary lines called Rows, analogous to latitudes. The location of each LDA can be identified by the Row it occupies and its position in the Row. For example, LDA No. 13,449 is located at Row 78, Position 266. The SCR stores the row and position values of the calculated LDA in an LDA occurrence table 74. The illustrated table 74 has room for storing 19 separate LDA's, and a column 75 to indicate how many times a particular LDA was calculated as being the SCR's likely present position.

In the next step 76, the SCR determines whether K number of superframes have passed since it began the most recent cycle of executing step 72. The SCR is programmed to repeatedly execute step 72 during a predetermined period of time that corresponds to K superframes. If a count of K superframes has not been reached when step 76 is executed, the program proceeds to step 78 where it is instructed to return to the beginning of the program and execute step 72 again. If this results in the SCR again identifying its present LDA as the same LDA that it had previously identified during the same cycle, then the count for that particular row and position is incremented. This cycle continues, with row and position entries being made in table 74 for each different LDA position that is calculated per step 72, and with a count being incremented each time a calculated LDA matches the row and position value previously entered in the table 74.

A cycle ends when K superframes have passed, whereupon the program advances from step 76 to step 80 to determine the LDA which best represents the present position of the SCR. This determination is made by selecting, from the table 74, the LDA having the highest count indicated in column 75. It can be seen, therefore, that the activities represented by steps 72–80 comprise calculating values representing the SCR's estimated present position, noting in table 74 how often a calculated value matches a previously calculated value, and choosing, as the best present location of the SCR, the calculated value that was most often matched.

In the next step 82, a determination is made as to whether an Initial LDA is available. If the SCR was just powered up or reset, there may be no Initial LDA value stored in the SCR. In that case, the program proceeds to step 84 where the SCR is instructed to store the best LDA (previously determined per step 80) for use as the Initial LDA during the next pass through the program. The program then returns (step 86) to its first step 72 to begin another cycle in which the table 74 will accumulate values and counts from which the best LDA will be chosen.

If the answer to step 82 is affirmative, the program advances to step 88. At this step, the SCR determines the distance between its present location (the best LDA as determined in step 80) and a known previous location (the Initial LDA) from which the SCR may have roamed. This distance is preferably determined using a great circle distance calculation. If that distance is greater than the given cut-off distance, this indicates that the SCR may have roamed to a new MDA, and the program advances to step 90.

Because the SCR has roamed a significant distance, as from LDA 1 to LDA 3 in FIG. 1, the value for the Initial LDA is replaced with the value for the best LDA (from step 80). In this example, therefore, if LDA 1 were the initial LDA and the SCR roamed to LDA 3, and LDA 3 was determined to be the best LDA, then step 90 would cause LDA 3 to replace LDA 1 as the Initial LDA. Consequently, LDA 3 will be the location from which distance is measured the next time step 88 is executed.

In the next step 92, the SCR initiates a re-registration procedure by causing the display 46 (FIG. 2) to display a message that alerts the user to notify the communication system as to which MDA his SCR is now located in. If the SCR is capable of transmitting a message, the SCR may display the message alert per step 92, and it preferably transmits to the communication system a message announcing that the SCR has roamed to a new, identified MDA.

Referring back to step 88, if the distance traveled is less than the given cut-off distance (as from LDA 1 to LDA 2 in FIG. 1), the program proceeds to step 94. Here, the Initial LDA value is maintained (e.g., LDA 1), and the program returns to the beginning per step 96. Thus, any additional distance traveled will again be compared to LDA 1 (the Initial LDA) when step 88 is next executed.

With this technique, a user can move from one location to another without fear of missing a message due to being out of range. His SCR will automatically initiate the re-registration procedure each time his SCR moves a substantial, predetermined distance from its previous location.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a communication system in which RF signals are transmitted from satellites to selective call receivers (SCRs) that can roam from one message delivery area to other message delivery areas, a method for keeping a SCR registered in the proper message delivery area, comprising, in the SCR:
    a) determining a present location for the SCR by repeatedly calculating values representing estimated present position, noting how often a calculated value matches a previously calculated value, and choosing, as the present location of the SCR, the calculated value that was most often matched;
    b) determining the distance between the SCR's present location and a known previous location from which the SCR may have roamed; and
    c) if the distance calculated in paragraph b) exceeds a given distance, initiating a re-registration procedure.

2. A method as set forth in claim 1 wherein initiating a re-registration procedure comprises alerting a user of the SCR that the SCR has likely moved to a different message delivery area.

3. A method as set forth in claim 1 wherein initiating a re-registration procedure comprises transmitting a re-registration signal to the communication system.

4. A method as set forth in claim 1 wherein an SCR becomes active to receive information at predetermined times, wherein a value representing estimated present position is calculated each time an SCR is active, and wherein the present location of the SCR is chosen following a predetermined time period during which the values were calculated.

5. A method as set forth in claim 4 wherein the communication system uses a signaling protocol in which information is formatted into superframes for transmission of data to SCR's, and wherein the predetermined time period corresponds to a plurality of superframes.

6. A method as set forth in claim 1 wherein, if the distance calculated in paragraph b) does not exceed the given distance, the re-registration procedure is not initiated immediately, and additional determinations of present location are continued as the SCR roams until the distance between a most recently determined present location and the known previous location exceeds the given distance.

7. A method as set forth in claim 6 wherein when the distance between a most recently determined present location and the known previous location exceeds the given distance, the re-registration procedure is initiated and the most recently determined present location is used as the known previous location when paragraphs a), b) and c) are executed again.

8. In a communication system in which RF signals are transmitted from satellites to selective call receivers (SCRs) that can roam between message delivery areas, wherein a message delivery area includes a plurality of LDA's (Logical Delivery Areas), a method for keeping a SCR registered in the proper message delivery area, comprising, in the SCR:
    a) determining a present LDA where the SCR is located by repeatedly calculating values representing estimated present LDA, noting how often a calculated value matches a previously calculated value, and choosing, as the present LDA of the SCR, the calculated value that was most often matched;
    b) determining the distance between the present LDA and a known previous LDA from which the SCR has roamed;
    c) if the distance calculated in paragraph b) exceeds a given distance, initiating a procedure to register the SCR in a new message delivery area;

d) if the distance calculated in paragraph b) does not exceed the given distance, delaying the procedure and making additional determinations of present LDA as the SCR roams;

e) when the distance between a most recently determined present LDA and the known previous LDA exceeds the given distance, initiating the procedure; and f) executing paragraphs a), b) and c) again using the most recently determined present LDA as the known previous LDA.

9. A method as set forth in claim 8 wherein initiating a procedure to register the SCR comprises alerting a user of the SCR that the SCR has likely moved to a different message delivery area.

10. In a communication system in which RF signals are transmitted from satellites to selective call receivers (SCRs) that can roam between message delivery areas, wherein a message delivery area includes a plurality of LDA's (Logical Delivery Areas), and wherein the SCR's become active to receive information at predetermined times, a method for keeping a SCR registered in the proper message delivery area, comprising, in the SCR:

a) calculating values representing an estimated LDA where the SCR is located each time the SCR becomes active;

b) noting how often a calculated value matches a previously calculated value, and choosing, as the present LDA of the SCR, the calculated value that was most often matched;

c) determining the distance between the present LDA and a known previous LDA from which the SCR has roamed;

d) if the distance calculated in paragraph c) does not exceed a given distance, delaying a re-registration procedure and making additional determinations of present LDA as the SCR roams; and e) when the distance between a most recently determined present LDA and the known previous LDA exceeds the given distance, initiating the re-registration procedure to register the SCR in a new message delivery area, and executing paragraphs a), b) and c) again using the most recently determined present LDA as the known previous LDA.

11. A method as set forth in claim 10 wherein initiating a re-registration procedure comprises alerting a user of the SCR that the SCR has likely moved to a different message delivery area.

12. A method as set forth in claim 10 wherein initiating a re-registration procedure comprises transmitting a re-registration signal to the communication system.

* * * * *